G. TEUBER.
ELECTRIC HEATING APPARATUS.
APPLICATION FILED SEPT. 4, 1907.
917,504.
Patented Apr. 6, 1909.
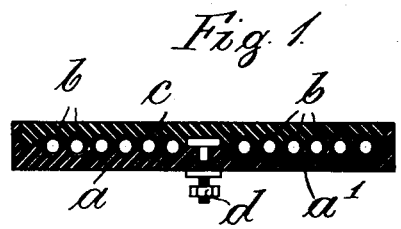
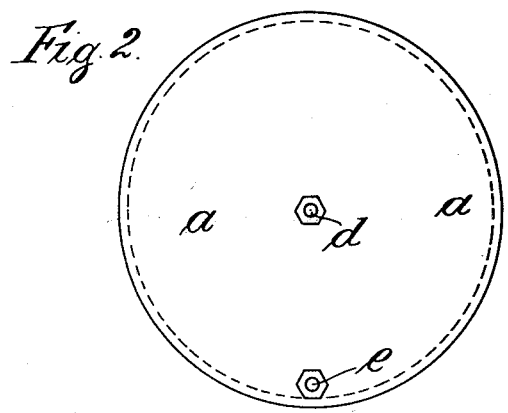
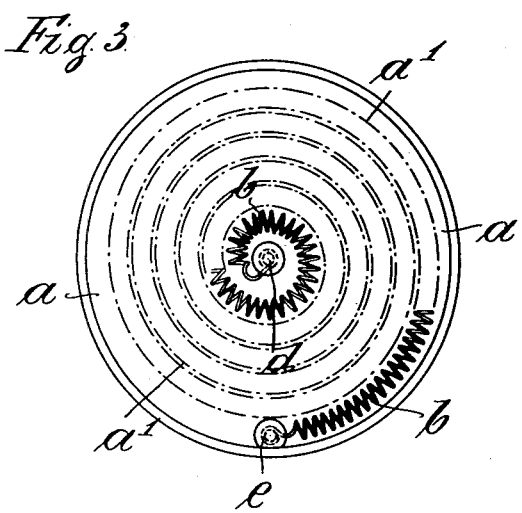
Witnesses:
Paul Wollenberg.
Emil Kayser.
Inventor:
Gustav Teuber.
by
Attorney.

UNITED STATES PATENT OFFICE.

GUSTAV TEUBER, OF LAASPHE, GERMANY.

ELECTRIC HEATING APPARATUS.

No. 917,504.  Specification of Letters Patent.  Patented April 6, 1909.

Application filed September 4, 1907. Serial No. 391,363.

*To all whom it may concern:*

Be it known that I, GUSTAV TEUBER, a subject of the King of Prussia, German Empire, and resident of Laasphe, Kingdom of Prussia, Germany, have invented certain new and useful Improvements in Electric Heating Apparatus, of which the following is an exact specification.

This invention relates to electric heating apparatus and more especially to the heating plates used in such apparatus and provided with spirally shaped electric heating resistances. In such heating plates the spirals hitherto have been separated or isolated from each other by mica or asbestos, but this kind of arrangement has proved to be unsatisfactory with regard to the delivery of heat and utilization of electric energy. For removing these disadvantages the present invention is intended and it consists in a heating plate in which the electric heating resistances are embedded in a fire-proof and isolating ceramic paste, and in the particular arrangement and application of the different parts to be used in connection with such heating plates.

To make my invention clear, reference is had to the accompanying drawings, in which:

Figure 1 is a plan, and Fig. 2 a cross section on line A—A of Fig. 1. Fig. 3 is a plan the covering as used in this invention being removed.

Referring to the figures $a$ is a base plate which is made of ceramic paste; this ceramic paste consists according to the invention of quartz, and further basic elements such as clay, white clay and suitable fluxes together with water-glass may be added. The mineral, such as quartz, is pulverized and intimately mixed with clay, the flux and water-glass. Different fluxes may be used, but I prefer to use feldspar. The paste produced as described is cast in the form of a plate having spiral-shaped passages $a'$. For molding this base plate $a$ in the manner indicated, preferably a dish having a low brim is used and into this dish or mold the porcelain-paste is brought. After this the base plate is caused to dry in the open air and not subjected to any heat. The heating spiral $b$ of any convenient or preferred material is now placed into the spiral passages of the base plate and afterward a porcelain-paste obtained as above mentioned is poured over the base plate so as to form a covering $c$ and also allowed to dry in the open air. As soon as the paste is dry, the heating plate is placed between two heated plates, or otherwise exposed to heat, in order to be fritted, that is to say, no burning of the material takes place. When the material is perfectly solid, the heating body is finished for use.

It may be observed that it is perfectly impossible for the spiral heating resistance to change its place and due to its being entirely embedded in heat transmitting materials a good exchange of heat between the electric heat-resistance and the body to be heated can take place.

In the Fig. 3 the cover is removed and as seen therein, $d$ $e$ are two terminals for connecting the heating spiral to the electric conductors, not further shown.

Having thus fully described the nature of my invention, what I desire to secure by Letters Patent of the United States is:—

1. The art of making heating plates for electric heating apparatus consisting in embedding a bare spiral conductor in an upper and lower plate made of ceramic paste composed of pulverized quartz, white clay and water glass together with a flux, drying said plate in the air and then fritting it, substantially as described.

2. The art of making heating plates for electric heating apparatus, consisting in forming a base plate having spiral passages of a ceramic paste composed of pulverized quartz, white clay and water glass together with a flux, drying the base plate in the open air, mounting heating spirals in the said spiral passages, laying a ceramic paste composed as mentioned on the base plate so as to completely embed the heating spiral, drying the paste in the open air and then fritting the complete heating plate thereby produced.

3. The art of making heating plates for electric heating apparatus, consisting in forming a base plate having spiral passages, of pulverized quartz, white clay, feldspar and water-glass, in placing the spiral heating resistance into said spiral passages, applying the afore mentioned paste on the base plate, in drying the plate so formed first in the open air and then fritting it.

4. A heating plate for use in electric heating apparatus comprising a base plate of a ceramic paste consisting of quartz, white clay, feldspar and water-glass, a heating resistance embedded in said plate and a cover formed of the aforementioned ceramic paste.

5. A heating plate for use in electric heating apparatus comprising a base plate having spiral passages and formed of a mixture of quartz, white clay, feldspar and water-glass, a spiral heating body placed in said passages, and a cover formed of the aforementioned ceramic paste.

In witness whereof I have hereunto set my hand in the presence of two witnesses.

GUSTAV TEUBER. [L. S.]

Witnesses:
   OTTO KÖNIG,
   WM. WASHINGTON BRUNSWICK.